US009860081B2

(12) United States Patent
Keesara et al.

(10) Patent No.: US 9,860,081 B2
(45) Date of Patent: Jan. 2, 2018

(54) GENERAL USER NETWORK INTERFACE (UNI) MULTI-HOMING TECHNIQUES FOR SHORTEST PATH BRIDGING (SPB) NETWORKS

(71) Applicant: Extreme Networks, Inc., San Jose, CA (US)

(72) Inventors: Srikanth Keesara, Tewksbury, MA (US); Roger Lapuh, Uesslingen (CH)

(73) Assignee: Extreme Networks, Inc., San Jose, CA (US)

(*) Notice: Subject to any disclaimer, the term of this patent is extended or adjusted under 35 U.S.C. 154(b) by 282 days.

(21) Appl. No.: 13/920,218

(22) Filed: Jun. 18, 2013

(65) Prior Publication Data

US 2014/0369184 A1    Dec. 18, 2014

(51) Int. Cl.
*H04L 12/46*    (2006.01)
*H04L 12/705*    (2013.01)
(Continued)

(52) U.S. Cl.
CPC ...... *H04L 12/4662* (2013.01); *H04L 12/4658* (2013.01); *H04L 12/4625* (2013.01);
(Continued)

(58) Field of Classification Search
None
See application file for complete search history.

(56) References Cited

U.S. PATENT DOCUMENTS 6,906,998 B1 *  6/2005  Mujeeb ................. H04L 49/552
                                                                370/218
7,345,991 B1 *  3/2008  Shabtay .............. H04L 12/2863
                                                                370/221
(Continued)

FOREIGN PATENT DOCUMENTS

EP        1408655           4/2004
EP        2031796 A1        3/2009
(Continued)

OTHER PUBLICATIONS

GB Search Report dated Jun. 9, 2014, 4 pages.
(Continued)

*Primary Examiner* — Andrew Oh
(74) *Attorney, Agent, or Firm* — Haley Guiliano LLP (57) ABSTRACT

A method, apparatus and computer program product for providing multi-homing techniques for SPB networks is presented. A set of UNI nodes that receive multicast packets are determined based on Backbone Media Access Control-Destination Address (BMAC-DA)/I-Tag Service Identifier (I-SID) of received multicast packets for multicast packets within a transport network. A separate Egress Port Mask is determined for each Backbone-Virtual Local Area Network (B-VLAN) of the transport network, wherein the Egress Port Mask is determined such that only one UNI node of the set of UNI nodes forwards said multicast packets. A set of UNI copies of said multicast packets are filtered out by applying the Egress Port Mask, wherein copies that are not in the Egress Port Mask are dropped. Copies of multicast packets that are not dropped are sent out.

17 Claims, 3 Drawing Sheets

(51) Int. Cl.
    *H04L 12/715*    (2013.01)
    *H04L 12/761*    (2013.01)
    *H04L 12/703*    (2013.01)

(52) U.S. Cl.
    CPC ...... *H04L 12/4633* (2013.01); *H04L 12/4641* (2013.01); *H04L 45/04* (2013.01); *H04L 45/16* (2013.01); *H04L 45/18* (2013.01); *H04L 45/28* (2013.01)

(56) References Cited

U.S. PATENT DOCUMENTS

| | | | |
|---|---|---|---|
| 7,933,268 B1 | 4/2011 | Melman et al. | |
| 8,451,715 B1* | 5/2013 | Doshi | H04L 45/66 370/218 |
| 8,549,178 B2* | 10/2013 | Sultan | H04L 12/462 709/249 |
| 8,565,230 B2 | 10/2013 | Keesara et al. | |
| 8,650,286 B1* | 2/2014 | Sajassi | H04L 45/586 370/389 |
| 8,675,522 B2 | 3/2014 | Keesara et al. | |
| 8,675,658 B2 | 3/2014 | Keesara et al. | |
| 8,743,875 B2 | 6/2014 | Khera et al. | |
| 8,750,299 B2 | 6/2014 | Keesara et al. | |
| 8,804,722 B2 | 8/2014 | Appalla et al. | |
| 8,817,782 B2 | 8/2014 | Appalla et al. | |
| 8,830,998 B2 | 9/2014 | Keesara et al. | |
| 8,949,385 B2 | 2/2015 | Keesara et al. | |
| 9,300,540 B2 | 3/2016 | Fitzgerald et al. | |
| 2002/0191628 A1* | 12/2002 | Liu | H04L 12/18 370/428 |
| 2005/0281194 A1* | 12/2005 | Sonoda | H04L 45/586 370/220 |
| 2008/0062994 A1* | 3/2008 | Porat | H04L 45/00 370/392 |
| 2008/0172497 A1* | 7/2008 | Mohan | H04L 12/4616 709/249 |
| 2010/0098078 A1 | 4/2010 | Bisdikian | |
| 2010/0157793 A1* | 6/2010 | Sajassi | G06F 11/2007 370/228 |
| 2010/0306415 A1* | 12/2010 | Sultan | H04L 12/462 709/249 |
| 2011/0194404 A1 | 8/2011 | Kluger et al. | |
| 2011/0286462 A1* | 11/2011 | Kompella | H04L 45/18 370/395.53 |
| 2012/0063465 A1 | 3/2012 | Keesara et al. | |
| 2012/0106347 A1* | 5/2012 | Allan | H04L 12/4625 370/238 |
| 2012/0127855 A1* | 5/2012 | Alon | H04L 12/413 370/218 |
| 2012/0182876 A1* | 7/2012 | Miyabe | 370/242 |
| 2012/0201124 A1* | 8/2012 | Marques et al. | 370/221 |
| 2012/0243544 A1* | 9/2012 | Keesara | H04L 12/4633 370/395.53 |
| 2013/0028141 A1* | 1/2013 | Bhamare | H04L 12/4658 370/255 |
| 2013/0077624 A1 | 3/2013 | Keesara et al. | |
| 2013/0114619 A1* | 5/2013 | Wakumoto | H04L 12/4641 370/406 |
| 2013/0195111 A1* | 8/2013 | Allan | H04L 12/462 370/395.53 |
| 2013/0279323 A1* | 10/2013 | Allan | H04L 45/28 370/225 |
| 2013/0286817 A1* | 10/2013 | Allan | H04L 45/48 370/221 |
| 2013/0301472 A1* | 11/2013 | Allan | H04L 45/66 370/254 |
| 2014/0086100 A1 | 3/2014 | Keesara et al. | |
| 2014/0226531 A1* | 8/2014 | Farkas | H04L 41/0893 370/256 |
| 2014/0301275 A1* | 10/2014 | Chang | H04L 41/0846 370/328 |
| 2014/0307580 A1* | 10/2014 | Fung | H04L 49/50 370/254 |
| 2014/0355602 A1 | 12/2014 | Keesera | |
| 2014/0369184 A1 | 12/2014 | Keesara et al. | |
| 2014/0369352 A1 | 12/2014 | Zhou | |

FOREIGN PATENT DOCUMENTS

| | | |
|---|---|---|
| WO | 2004107106 A2 | 12/2004 |
| WO | 2013039786 A1 | 3/2013 |
| WO | 2013097609 A1 | 7/2013 |

OTHER PUBLICATIONS

Reval, Lionel; Office Action; U.S. Appl. No. 13/906,662 dated Oct. 16, 2015; United States Patent and Trademark Office; Alexandria, VA.

Preval, Lionel; Final Office Action; U.S. Appl. No. 13/906,662, dated Mar. 30, 2016; United States Patent and Trademark Office; Alexandria, VA.

Preval, Lionel; Office Action; U.S. Appl. No. 13/906,662, dated Oct. 6, 2016; United States Patent and Trademark Office; Alexandria, VA.

Preval, Lionel; Final Office Action; U.S. Appl. No. 13/906,662, dated Apr. 28, 2016; United States Patent and Trademark Office; Alexandria, VA.

Hickery, Dan; GB Search Report; dated Jun. 16, 2014; Intellectual Property Office; South Wales, GB.

* cited by examiner

GENERAL USER NETWORK INTERFACE (UNI) MULTI-HOMING TECHNIQUES FOR SHORTEST PATH BRIDGING (SPB) NETWORKS

BACKGROUND

In a computer network, network switching devices (switches) interconnect to form a path for transmitting information between an originator and a recipient. A routing mechanism, or protocol, defines switching logic that forwards the transmitted information in the form of packets between the switches as a series of "hops" along a path. At each switch, the switching logic identifies the next switch, or hop, in the path using an identifier such as a Media Access Control (MAC) address. Shortest Path Bridging (SPB) is a routing mechanism having switching logic such that each switch advertises the nodes it knows about to all the other switches, and eventually all the switches in the network have the same picture of the network and therefore can forward frames to the next hop along a shortest path.

SPB is defined in IEEE-802.1aq: IEEE standard for Shortest Path Bridging, and operates in conjunction with IEEE-802.1ah: IEEE standard for Provider Backbone Bridging, sometimes referred to as Mac-in-Mac encapsulation. Both SPB and SPBM forward packets on shortest path trees with minimum path cost as a first order tie-breaker, where for any pair of nodes A and B, the unicast path for A to B is the exact reverse of the path from B to A (reverse path congruency), and all multicast traffic between the two nodes follows the unicast path (multicast and unicast congruency). These are extensions to fundamental Ethernet forwarding properties in IEEE bridged networks.

SPB technology allows a network administrator to easily form mesh networks that distribute load more evenly across the network topology since it can mitigate bottlenecks at core links for traffic that only needs to go from one distribution switch to another. SPB technology is being adopted in Ethernet based data networks to enable Layer-2 and Layer-3 network virtualization. These networks are expected to continue to deliver business critical services even when a variety of network faults occur (or when maintenance operations are performed on the network).

Multi-homing is a mechanism by which an access network connects to and uses two or more devices in the transport network as if it were connecting to a single device. The multiple devices (network switches) in the transport network exchange information between them which allow them to present the access network to the rest of the transport network as if the access network was connected to a single device in the transport network. Failure of the connection of one of the transport devices to the access network or even the complete failure of one of the transport devices will not cause loss of connectivity between the access network and the transport network. The access network therefore exhibits multi-homed access, which is an access network that uses multi-homing to connect to multiple transport devices, and the transport devices define a multi-homed edge, or a group of partner devices, in the transport network that provide multi-homing service to an access network.

One conventional model for providing dual homing uses an access Link Aggregation Group (LAG) connecting two SPB Edges Nodes configured as a pair of InterSwitch Trunk (IST) switches. From a SPB Network perspective the pair of IST switches appear as two separate SPB Nodes. But from a forwarding plane perspective they appear as a single switch.

Another conventional model utilizes stacking with SPB. A set of SPB Edge Nodes provide a Distributed MultiLink Trunk (D-MLT) connecting an access device to a SPB Network. There can be more than two nodes in the same stack. From an SPB network perspective the stack appears as a single switch from both a control-plane and forwarding plane perspective.

SUMMARY

Conventional mechanisms such as those explained above suffer from a variety of deficiencies. One such deficiency with SMLT Dual-Homing is that some customers want more than just two switch redundancy. SMLT also requires dedicated intra-cluster links (IST) which it expects to be a highly resilient entity that "never" fails. In the event of an IST failure the fate of SMLT traffic varies between undefined, does not forward, causes loops etc. based on implementation.

Stacking does not suffer from being limited to two switches, but stacking still requires dedicated intra-cluster links and fixed intra-cluster topologies. If the intra-cluster links break in a fashion that results in separate islands of stack units each of which is still connected to the core network as well as access networks a whole slew of problems arise. These are undefined forwarding behaviors, possible network loops, duplication. Also since the stack was originally intended to be operated as a single control plane entity—a segmentation of the intra-cluster links causes the possibility that the each of the islands of the stack could claim to be the control plane for the stack (IP addresses, router-id values, system-id value) and cause general instability to routing protocols.

Embodiments of the invention significantly overcome such deficiencies and provide mechanisms and techniques that provide multi-homing techniques for SPB networks.

In a particular embodiment of a method for providing multi-homing techniques for SPB networks a set of UNI nodes that receive multicast packets are determined based on Backbone Media Access Control-Destination Address (BMAC-DA)/I-Tag Service Identifier (I-SID) of received multicast packets for multicast packets within a transport network. A separate Egress Port Mask is determined for each Backbone-Virtual Local Area Network (B-VLAN) of the transport network, wherein the Egress Port Mask is determined such that only one UNI node of the set of UNI nodes forwards said multicast packets. A set of UNI copies of said multicast packets are filtered out by applying the Egress Port Mask, wherein copies that are not in the Egress Port Mask are dropped. Copies of multicast packets that are not dropped are sent out.

Other embodiments include a computer readable medium having computer readable code thereon for providing multi-homing techniques for SPB networks. A set of UNI nodes that receive multicast packets are determined based on Backbone Media Access Control-Destination Address (BMAC-DA)/I-Tag Service Identifier (I-SID) of received multicast packets for multicast packets within a transport network. A separate Egress Port Mask is determined for each Backbone-Virtual Local Area Network (B-VLAN) of the transport network, wherein the Egress Port Mask is determined such that only one UNI node of the set of UNI nodes forwards said multicast packets. A set of UNI copies of said multicast packets are filtered out by applying the Egress Port Mask, wherein copies that are not in the Egress Port Mask are dropped. Copies of multicast packets that are not dropped are sent out.

Still other embodiments include a computerized device, configured to process all the method operations disclosed herein as embodiments of the invention. In such embodiments, the computerized device includes a memory system, a processor, communications interface in an interconnection mechanism connecting these components. The memory system is encoded with a process that provides multi-homing techniques for SPB networks as explained herein that when performed (e.g. when executing) on the processor, operates as explained herein within the computerized device to perform all of the method embodiments and operations explained herein as embodiments of the invention. Thus any computerized device that performs or is programmed to perform up processing explained herein is an embodiment of the invention.

Other arrangements of embodiments of the invention that are disclosed herein include software programs to perform the method embodiment steps and operations summarized above and disclosed in detail below. More particularly, a computer program product is one embodiment that has a computer-readable medium including computer program logic encoded thereon that when performed in a computerized device provides associated operations providing multi-homing techniques for SPB networks as explained herein. The computer program logic, when executed on at least one processor with a computing system, causes the processor to perform the operations (e.g., the methods) indicated herein as embodiments of the invention. Such arrangements of the invention are typically provided as software, code and/or other data structures arranged or encoded on a computer readable medium such as an optical medium (e.g., CD-ROM), floppy or hard disk or other a medium such as firmware or microcode in one or more ROM or RAM or PROM chips or as an Application Specific Integrated Circuit (ASIC) or as downloadable software images in one or more modules, shared libraries, etc. The software or firmware or other such configurations can be installed onto a computerized device to cause one or more processors in the computerized device to perform the techniques explained herein as embodiments of the invention. Software processes that operate in a collection of computerized devices, such as in a group of data communications devices or other entities can also provide the system of the invention. The system of the invention can be distributed between many software processes on several data communications devices, or all processes could run on a small set of dedicated computers, or on one computer alone.

It is to be understood that the embodiments of the invention can be embodied strictly as a software program, as software and hardware, or as hardware and/or circuitry alone, such as within a data communications device. The features of the invention, as explained herein, may be employed in data communications devices and/or software systems for such devices such as those manufactured by Avaya, Inc. of Basking Ridge, N.J.

Note that each of the different features, techniques, configurations, etc. discussed in this disclosure can be executed independently or in combination. Accordingly, the present invention can be embodied and viewed in many different ways. Also, note that this summary section herein does not specify every embodiment and/or incrementally novel aspect of the present disclosure or claimed invention. Instead, this summary only provides a preliminary discussion of different embodiments and corresponding points of novelty over conventional techniques. For additional details, elements, and/or possible perspectives (permutations) of the invention, the reader is directed to the Detailed Description section and corresponding figures of the present disclosure as further discussed below.

BRIEF DESCRIPTION OF THE DRAWINGS

The foregoing will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

The embodiments set forth below represent the necessary information to enable those skilled in the art to practice the invention and illustrate the best mode of practicing embodiments of the invention. Upon reading the following description in light of the accompanying figures, those skilled in the art will understand the concepts of the invention and recognize applications of these concepts not particularly addressed herein. It should be understood that these concepts and applications fall within the scope of the disclosure and the accompanying claims.

The preferred embodiment of the invention will now be described with reference to the accompanying drawings. The invention may, however, be embodied in many different forms and should not be construed as limited to the embodiment set forth herein; rather, this embodiment is provided so that this disclosure will be thorough and complete, and will fully convey the scope of the invention to those skilled in the art. The terminology used in the detailed description of the particular embodiment illustrated in the accompanying drawings is not intended to be limiting of the invention. In the drawings, like numbers refer to like elements.

The presently described method and apparatus relating to General User Network Interface (UNI) Multi-homing Techniques for Shortest Path Bridging (SPB) Networks provides the next stage of evolution of the SMLT and Stacking solutions. The present invention provides redundancy of more than two nodes and does not require special intra-cluster links. Further, the present invention provides defined behaviors and traffic protection in the event of any combination of failures of cluster nodes, access links, network links and core nodes, and does not destabilize the routing protocol with any combination of failures (however unlikely). Further still, the present invention is fully active/active traffic forwarding and provides continuous and predefined management access to all active members of a multi-homed LAG solution.

Figure 1:
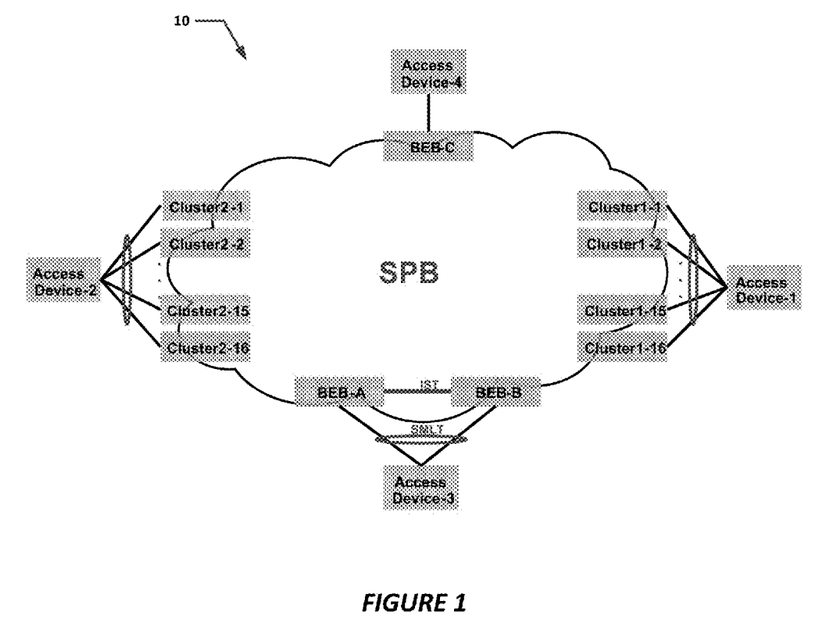
FIG. 1 depicts a block diagram of a multi-homing transport network in accordance with embodiments of the invention.

Referring now to FIG. 1, an environment 10 including a transport network (SPB) and associated edge devices are shown. BEB-A and BEB-B are arranged in a conventional SMLT arrangement wherein an IST is used to send messages between the two devices. BEB-C is a stand-alone device and operates in conventional ways.

Devices labeled Cluster 1-1 through cluster 1-16 are multi-homed to form a UNI LAG in accordance with the present invention. Devices labeled Cluster 2-1 through cluster 2-16 are also multi-homed to form a UNI LAG in accordance with the present invention.

Normally when multicast traffic is received at an edge device it is sent to all the UNI access points on the service. This would happen for multicast traffic received by BEB-A, BEB-B and also BEB-C.

For cluster devices 1-1 through 1-16 and also cluster devices 2-1 through 2-16, the following rules are executed. First, for multicast traffic decide the set of UNI access-points that will receive the traffic based on the BMAC_DA/I-SID. Second, filter out the set of UNI copies by applying an Egress Port Mask (for each B-VLAN is there is a separate Egress Port Mask). A separate Egress Port Mask is determined for each B-VLAN such that only one UNI node forwards the multicast traffic. Next, copies that are not in the port mask are dropped, while the other copies are sent out.

The Egress Port Mask is manipulated to achieve the following goals. Each SPB Node is responsible for forwarding multicast traffic received on at least one of the B-VLANs to the Multi-homed LAGs. For example, cluster devices 2-1 through 2-16 each are responsible for one of 16 BVLANs (e.g., cluster device 2-1 is responsible for BVLAN1; cluster device 2-2 is responsible for BVLAN2, etc.)

If there are more B-VLANs than nodes in a cluster, then some of the nodes are responsible for multicast traffic on more than one B-VLAN. For example if there are 17 BVLANs, then cluster device 2-1 is responsible for BVLAN1 and BVLAN 17, cluster device 2-2 is responsible for BVLAN2, etc.

If there is an access network fault on a UNI LAG at one of the nodes in the cluster then the Egress Mask(s) of the BVLAN(s) assigned to that node are modified in such a way that one of the other nodes in the cluster that still has a connection to the UNI LAG is now responsible for making the copies for each of these B-VLANs. For example if there are 16 BVLANs, and cluster device 2-2 failed, then cluster device 2-1 is responsible for BVLAN1 and BVLAN 2, cluster device 2-3 is responsible for BVLAN3, etc. while cluster device 2-2 is down.

A private protocol is used between nodes in the cluster to exchange port state information for the Multi-homed UNI LAG. The Egress Port Mask is manipulated for each of the B-VLANs based on Multi-Homed UNI port state information received on the clustering protocol. The SPB Network is used to build a multipoint transport channel for the clustering protocol.

The present invention provides several advantages as compared to conventional arrangements. The present invention lifts the limitation of two nodes in a cluster. There are no requirements for dedicated intra-cluster links and so there are no ill effects from severing of intra-cluster links. There is no multiple personality disorder—where isolated islands of the cluster exist in the same network. A multipoint protocol is used for cluster discovery and synchronization. The clustering protocol survives as long as the network routing protocol maintains connectivity between the cluster nodes.

Figure 2:
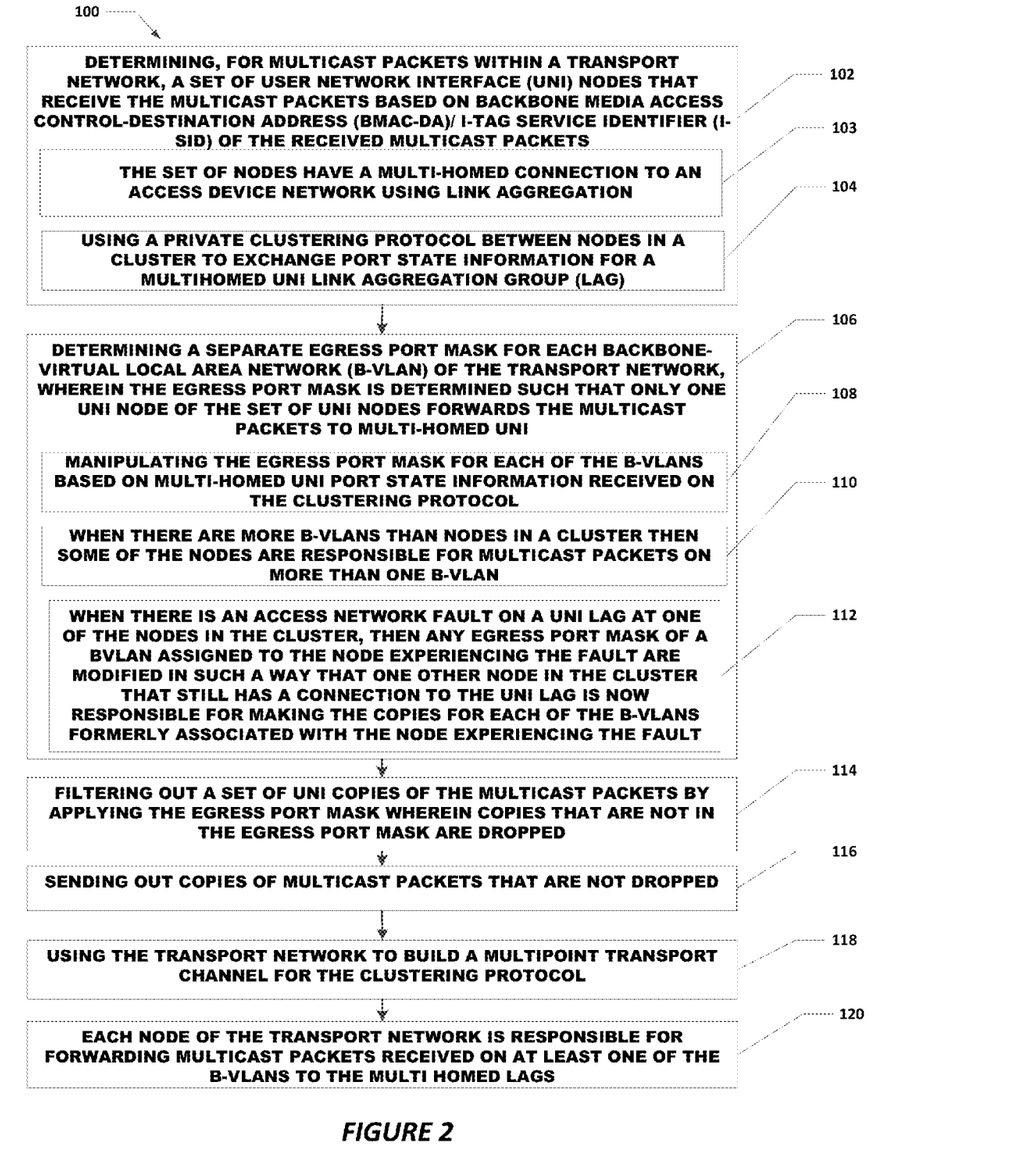
FIG. 2 is a flow diagram of a particular embodiment of a method for providing multi-homing techniques for SPB networks in accordance with embodiments of the invention.

A flow chart of a particular embodiment of the presently disclosed method is depicted in FIG. 2. The rectangular elements are herein denoted "processing blocks" and represent computer software instructions or groups of instructions. Alternatively, the processing blocks represent steps performed by functionally equivalent circuits such as a digital signal processor circuit or an application specific integrated circuit (ASIC). The flow diagrams do not depict the syntax of any particular programming language. Rather, the flow diagrams illustrate the functional information one of ordinary skill in the art requires to fabricate circuits or to generate computer software to perform the processing required in accordance with the present invention. It should be noted that many routine program elements, such as initialization of loops and variables and the use of temporary variables are not shown. It will be appreciated by those of ordinary skill in the art that unless otherwise indicated herein, the particular sequence of steps described is illustrative only and can be varied without departing from the spirit of the invention. Thus, unless otherwise stated the steps described below are unordered meaning that, when possible, the steps can be performed in any convenient or desirable order.

Referring now to FIG. 2, a particular embodiment of a method for providing General User Network Interface (UNI) Multi-homing Techniques for Shortest Path Bridging (SPB) Networks is shown. Method 100 begins with processing block 102 which discloses determining, for multicast packets within a transport network, a set of User Network Interface (UNI) nodes that receive the multicast packets based on Backbone Media Access Control-Destination Address (BMAC-DA)/I-Tag Service Identifier (I-SID) of the received multicast packets. Processing block 103 shows the set of nodes have a multi-homed connection to an access device network using link aggregation. Processing block 104 states using a private clustering protocol between nodes in a cluster to exchange port state information for a multi-homed UNI Link Aggregation Group (LAG).

Processing block 106 recites determining a separate Egress Port Mask for each Backbone-Virtual Local Area Network (B-VLAN) of the transport network, wherein the Egress Port Mask is determined such that only one UNI node of the set of UNI nodes forwards the multicast packets to the multi-homed UNI.

Processing block 108 states manipulating the Egress Port Mask for each of the B-VLANs based on Multi-Homed UNI port state information received on the clustering protocol. As shown in processing block 110, when there are more B-VLANs than nodes in a cluster then some of the nodes are responsible for multicast packets on more than one B-VLAN. Processing block 112 recites wherein when there is an access network fault on a UNI LAG at one of the nodes in the cluster, then any Egress Port Mask of a BVLAN assigned to the node experiencing the fault are modified in such a way that one other node in the cluster that still has a connection to the UNI LAG is now responsible for making the copies for each of the B-VLANs formerly associated with the node experiencing the fault.

Processing continues with processing block 114 which discloses filtering out a set of UNI copies of the multicast packets by applying the Egress Port Mask wherein copies that are not in the Egress Port Mask are dropped. Processing block 116 states sending out copies of multicast packets that are not dropped.

As shown in processing block 118, the transport network is used to build a multipoint transport channel for the clustering protocol. As further shown in processing block 120 each node of the transport network is responsible for forwarding multicast packets received on at least one of the B-VLANs to the Multi-homed LAGs.

Figure 3:
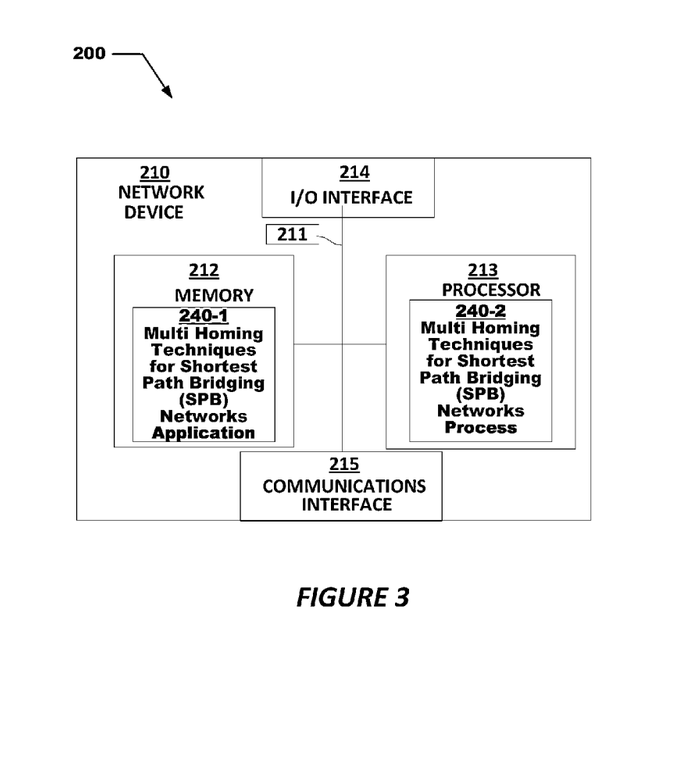
FIG. 3 illustrates an example computer system architecture for a computer system that provides multi-homing techniques for SPB networks in accordance with embodiments of the invention.

FIG. 3 is a block diagram illustrating an example architecture of a computer system 210 that executes, runs, interprets, operates or otherwise performs a multi-homing for SPB networks operating application 240-1 and multi-homing for SPB networks operating process 240-2 suitable for use in explaining example configurations disclosed herein. As shown in this example, the computer system 210 includes an interconnection mechanism 211 such as a data bus or other circuitry that couples a memory system 212, a processor 213, an input/output interface 214, and a communications interface 215. The communications interface 215 enables the computer system 210 to communicate with other devices (i.e., other computers) on a network (not shown).

The memory system 212 is any type of computer readable medium, and in this example, is encoded with a multi-homing for SPB networks operating application 240-1 as explained herein. The multi-homing for SPB networks operating application 240-1 may be embodied as software code such as data and/or logic instructions (e.g., code stored in the memory or on another computer readable medium such as a removable disk) that supports processing functionality according to different embodiments described herein. During operation of the computer system 210, the processor 213 accesses the memory system 212 via the interconnect 211 in order to launch, run, execute, interpret or otherwise perform the logic instructions of a multi-homing for SPB networks operating application 240-1. Execution of a multi-homing for SPB networks operating application 240-1 in this manner produces processing functionality in the multi-homing for SPB networks operating process 240-2. In other words, the multi-homing for SPB networks operating process 240-2 represents one or more portions or runtime instances of a multi-homing for SPB networks operating application 240-1 (or the entire a multi-homing for SPB networks operating application 240-1) performing or executing within or upon the processor 213 in the computerized device 210 at runtime.

It is noted that example configurations disclosed herein include the multi-homing for SPB networks operating application 240-1 itself (i.e., in the form of un-executed or non-performing logic instructions and/or data). The multi-homing for SPB networks operating application 240-1 may be stored on a computer readable medium (such as a floppy disk), hard disk, electronic, magnetic, optical, or other computer readable medium. A multi-homing for SPB networks operating application 240-1 may also be stored in a memory system 212 such as in firmware, read only memory (ROM), or, as in this example, as executable code in, for example, Random Access Memory (RAM). In addition to these embodiments, it should also be noted that other embodiments herein include the execution of a multi-homing for SPB networks operating application 240-1 in the processor 213 as the multi-homing for SPB networks operating process 240-2. Those skilled in the art will understand that the computer system 210 may include other processes and/or software and hardware components, such as an operating system not shown in this example.

During operation, processor 213 of computer system 200 accesses memory system 212 via the interconnect 211 in order to launch, run, execute, interpret or otherwise perform the logic instructions of the multi-homing for SPB networks application 240-1. Execution of multi-homing for SPB networks application 240-1 produces processing functionality in multi-homing for SPB networks process 240-2. In other words, the multi-homing for SPB networks process 240-2 represents one or more portions of the multi-homing for SPB networks application 240-1 (or the entire application) performing within or upon the processor 213 in the computer system 200.

It should be noted that, in addition to the multi-homing for SPB networks process 240-2, embodiments herein include the multi-homing for SPB networks application 240-1 itself (i.e., the un-executed or non-performing logic instructions and/or data). The multi-homing for SPB networks application 240-1 can be stored on a computer readable medium such as a floppy disk, hard disk, or optical medium. The multi-homing for SPB networks application 240-1 can also be stored in a memory type system such as in firmware, read only memory (ROM), or, as in this example, as executable code within the memory system 212 (e.g., within Random Access Memory or RAM).

In addition to these embodiments, it should also be noted that other embodiments herein include the execution of multi-homing for SPB networks application 240-1 in processor 213 as the multi-homing for SPB networks process 240-2. Those skilled in the art will understand that the computer system 200 can include other processes and/or software and hardware components, such as an operating system that controls allocation and use of hardware resources associated with the computer system 200.

The device(s) or computer systems that integrate with the processor(s) may include, for example, a personal computer (s), workstation(s) (e.g., Sun, HP), personal digital assistant (s) (PDA(s)), handheld device(s) such as cellular telephone (s), laptop(s), handheld computer(s), or another device(s) capable of being integrated with a processor(s) that may operate as provided herein. Accordingly, the devices provided herein are not exhaustive and are provided for illustration and not limitation.

References to "a microprocessor" and "a processor", or "the microprocessor" and "the processor," may be understood to include one or more microprocessors that may communicate in a stand-alone and/or a distributed environment(s), and may thus be configured to communicate via wired or wireless communications with other processors, where such one or more processor may be configured to operate on one or more processor-controlled devices that may be similar or different devices. Use of such "microprocessor" or "processor" terminology may thus also be understood to include a central processing unit, an arithmetic logic unit, an application-specific integrated circuit (IC), and/or a task engine, with such examples provided for illustration and not limitation.

Furthermore, references to memory, unless otherwise specified, may include one or more processor-readable and accessible memory elements and/or components that may be internal to the processor-controlled device, external to the processor-controlled device, and/or may be accessed via a wired or wireless network using a variety of communications protocols, and unless otherwise specified, may be arranged to include a combination of external and internal memory devices, where such memory may be contiguous and/or partitioned based on the application. Accordingly, references to a database may be understood to include one or more memory associations, where such references may include commercially available database products (e.g., SQL, Informix, Oracle) and also proprietary databases, and may also include other structures for associating memory such as links, queues, graphs, trees, with such structures provided for illustration and not limitation.

References to a network, unless provided otherwise, may include one or more intranets and/or the internet, as well as a virtual network. References herein to microprocessor instructions or microprocessor-executable instructions, in accordance with the above, may be understood to include programmable hardware.

Unless otherwise stated, use of the word "substantially" may be construed to include a precise relationship, condition, arrangement, orientation, and/or other characteristic, and deviations thereof as understood by one of ordinary skill in the art, to the extent that such deviations do not materially affect the disclosed methods and systems.

Throughout the entirety of the present disclosure, use of the articles "a" or "an" to modify a noun may be understood to be used for convenience and to include one, or more than one of the modified noun, unless otherwise specifically stated.

Elements, components, modules, and/or parts thereof that are described and/or otherwise portrayed through the figures to communicate with, be associated with, and/or be based on, something else, may be understood to so communicate, be associated with, and or be based on in a direct and/or indirect manner, unless otherwise stipulated herein.

Although the methods and systems have been described relative to a specific embodiment thereof, they are not so limited. Obviously many modifications and variations may become apparent in light of the above teachings. Many additional changes in the details, materials, and arrangement of parts, herein described and illustrated, may be made by those skilled in the art.

Having described preferred embodiments of the invention it will now become apparent to those of ordinary skill in the art that other embodiments incorporating these concepts may be used. Additionally, the software included as part of the invention may be embodied in a computer program product that includes a computer usable medium. For example, such a computer usable medium can include a readable memory device, such as a hard drive device, a CD-ROM, a DVD-ROM, or a computer diskette, having computer readable program code segments stored thereon. The computer readable medium can also include a communications link, either optical, wired, or wireless, having program code segments carried thereon as digital or analog signals. Accordingly, it is submitted that the invention should not be limited to the described embodiments but rather should be limited only by the spirit and scope of the appended claims.

What is claimed is:

1. A computer-implemented method in which a computer system performs operations comprising:
   determining, for multicast packets within a transport network, a set of User Network Interface (UNI) nodes, connected as a cluster to form a UNI Link Aggregation Group (UNI LAG), that receive the multicast packets based on Backbone Media Access Control-Destination Address (BMAC-DA)/I-Tag Service Identifier (I-SID) of the received multicast packets;
   making each UNI node responsible for forwarding multicast traffic for a different, respective one of a plurality of Backbone-Virtual Local Area Networks (B-VLANs) of the transport network;
   determining a separate, respective Egress Port Mask associated with each of plurality of Backbone-Virtual Local Area Networks (B-VLANs) of said transport network, wherein Egress Port Masks are determined such that only one UNI node of said set of UNI nodes forwards multicast packets of its respective one B-VLAN;
   at a particular one of the UNI nodes, filtering out a set of UNI copies of said multicast packets by applying the respective Egress Port Mask associated with each B-VLAN assigned to the one UNI node, wherein UNI copies that are not in the respective Egress Port Mask are dropped; and
   sending out, by the one UNI node, copies of multicast packets that are not dropped;
   wherein when there is an access network fault on the UNI LAG at one of the UNI nodes in the cluster, then the respective Egress Port Mask associated with any B-VLAN assigned to the UNI node experiencing the fault is modified in such a way that one other UNI node in said cluster that still has a connection to the UNI LAG is now responsible for making the copies for each of the B-VLANs formerly assigned to said UNI node experiencing the fault.

2. The method of claim 1, further comprising using a private clustering protocol between the UNI nodes in the cluster to exchange port state information for the multi-homed UNI LAG.

3. The method of claim 2, further comprising manipulating the respective Egress Port Mask associated with each of the B-VLANs based on Multi-Homed UNI port state information received on said clustering protocol.

4. The method of claim 2, further comprising using the transport network to build a multipoint transport channel for a clustering protocol.

5. The method of claim 1, wherein each node of said transport network is responsible for forwarding multicast packets received on at least one of the B-VLANs to the UNI LAG.

6. The method of claim 1, wherein when there are more B-VLANs than UNI nodes in the cluster then some of the UNI nodes are responsible for multicast packets on more than one B-VLAN.

7. A non-transitory computer readable storage medium having computer readable code thereon for providing multipoint switch clusters, the medium including instructions executable by a computer system to perform operations comprising:
   determining, for multicast packets within a transport network, a set of User Network Interface (UNI) nodes, connected as a cluster to form a UNI Link Aggregation Group (UNI LAG), that receive the multicast packets based on Backbone Media Access Control-Destination Address (BMAC-DA)/I-Tag Service Identifier (I-SID) of received multicast packets;
   making each UNI node responsible for forwarding multicast traffic for a different, respective one of a plurality of Backbone-Virtual Local Area Networks (B-VLANs) of the transport network;
   determining a separate, respective Egress Port Mask associated with each of plurality of Backbone-Virtual Local Area Networks (B-VLANs) of said transport network, wherein Egress Port Masks are determined such that only one UNI node of said set of UNI nodes forwards multicast packets of its respective one B-VLAN;
   at a particular one of the UNI nodes, filtering out a set of UNI copies of said multicast packets by applying the respective Egress Port Mask associated with each B-VLAN assigned to the one UNI node, wherein UNI copies that are not in the respective Egress Port Mask are dropped; and
   sending out, by the one UNI node, copies of multicast packets that are not dropped;
   wherein when there is an access network fault on the UNI LAG at one of the UNI nodes in the cluster, then the respective Egress Port Mask associated with any B-VLAN assigned to the UNI node experiencing the fault is modified in such a way that one other UNI node in said cluster that still has a connection to the UNI LAG is now responsible for making the copies for each of the B-VLANs formerly assigned to said UNI node experiencing the fault.

8. The non-transitory computer readable storage medium of claim 7, further comprising instructions for using a private clustering protocol between the UNI nodes in the cluster to exchange port state information for the multi-homed UNI LAG.

9. The non-transitory computer readable storage medium of claim 8, further comprising instructions for manipulating the respective Egress Port Mask associated with each of the B-VLANs based on Multi-Homed UNI port state information received on said clustering protocol.

10. The non-transitory computer readable storage medium of claim 8, further comprising instructions for using the transport network to build a multipoint transport channel for a clustering protocol.

11. The non-transitory computer readable storage medium of claim 7, each node of said transport network is responsible for forwarding multicast packets received on at least one of the B-VLANs to the UNI LAG.

12. The non-transitory computer readable storage medium of claim 7, wherein when there are more B-VLANs than UNI nodes in the cluster then some of the UNI nodes are responsible for multicast packets on more than one B-VLAN.

13. A computer system comprising:
a plurality of User Network Interface (UNI) nodes, each UNI node including:
a memory,
a processor,
a communications interface,
an interconnection mechanism coupling the memory, the processor and the communications interface; and
wherein the memory is encoded with an application providing multipoint switch clusters, that when performed on the processor, provides a process for processing information, the process causing the computer system to perform the operations of:
determining, for multicast packets within a transport network, a set of User Network Interface (UNI) nodes, connected as a cluster to form a UNI Link Aggregation Group (UNI LAG), that receive the multicast packets based on Backbone Media Access Control-Destination Address (BMAC-DA)/I-Tag Service Identifier (I-SID) of the received multicast packets;
making each UNI node responsible for forwarding multicast traffic for a different, respective one of a plurality of Backbone-Virtual Local Area Networks (B-VLANs) of the transport network;
determining a separate, respective Egress Port Mask associated with each of plurality of Backbone-Virtual Local Area Networks (B-VLANs) of said transport network, wherein Egress Port Masks are determined such that only one UNI node of said set of UNI nodes forwards multicast packets of its respective one B-VLAN;
at a particular one of the UNI nodes, filtering out a set of UNI copies of said multicast packets by applying the respective Egress Port Mask associated with each B-VLAN assigned to the one UNI node, wherein UNI copies that are not in the respective Egress Port Mask are dropped; and
sending out, by the one UNI node, copies of multicast packets that are not dropped;
wherein when there is an access network fault on the UNI LAG at one of the UNI nodes in the cluster, then the respective Egress Port Mask associated with any B-VLAN assigned to the UNI node experiencing the fault is modified in such a way that one other UNI node in said cluster that still has a connection to the UNI LAG is now responsible for making the copies for each of the B-VLANs formerly assigned to said UNI node experiencing the fault.

14. The computer system of claim 13, wherein the application providing multipoint switch clusters, that when performed on the processor, causes the computer system to perform the operations of:
using a private clustering protocol between the UNI nodes in the cluster to exchange port state information for the multi-homed UNI LAG.

15. The computer system of claim 14, wherein the application providing multipoint switch clusters, that when performed on the processor, causes the computer system to perform the operations of:
manipulating the respective Egress Port Mask associated with each of the B-VLANs based on Multi-Homed UNI port state information received on said clustering protocol.

16. The computer system of claim 14, wherein the application providing multipoint switch clusters, that when performed on the processor, causes the computer system to perform the operations of:
using the transport network to build a multipoint transport channel for a clustering protocol.

17. The computer system of claim 13, wherein each node of said transport network is responsible for forwarding multicast packets received on at least one of the B-VLANs to the UNI LAG.

* * * * *